Feb. 8, 1955 R. J. MILLER 2,701,728
WEIGHT SELECTION DEVICE FOR STABILIZING TRACTORS
Filed June 10, 1953 2 Sheets-Sheet 1
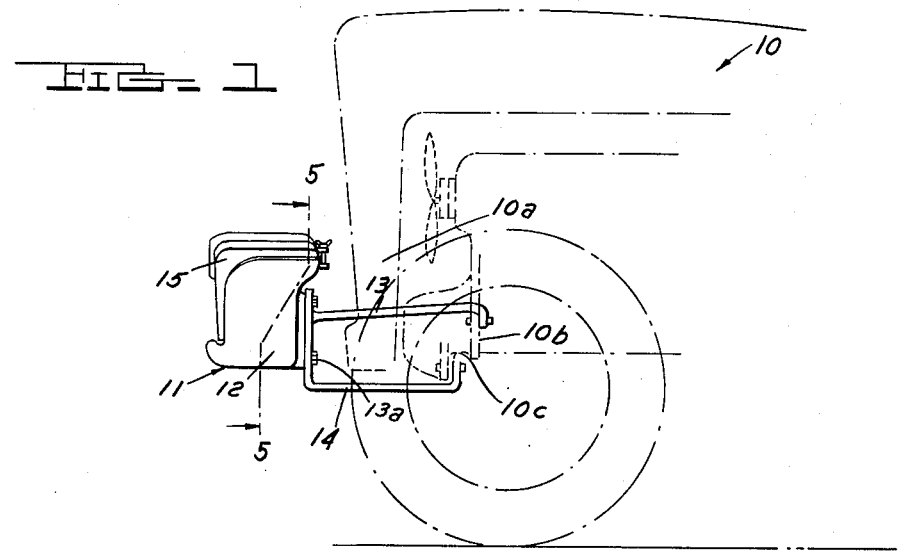
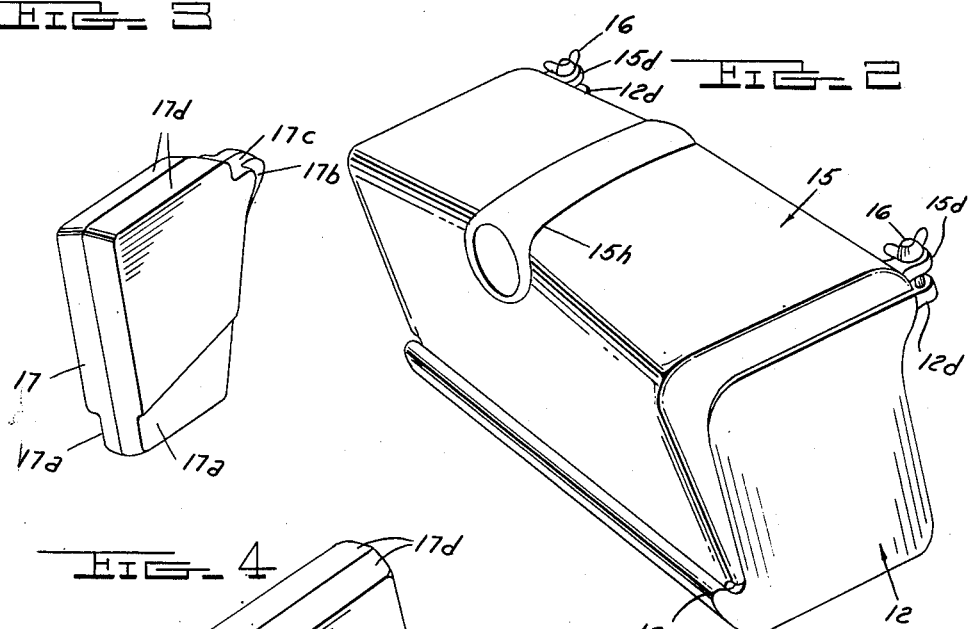
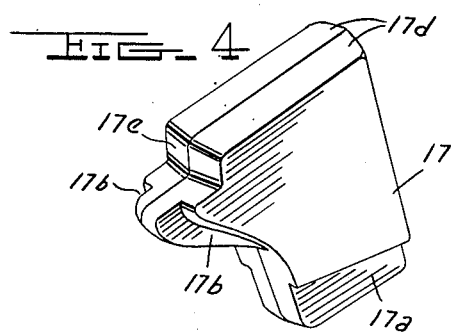
INVENTOR.
RAYMOND J. MILLER
BY
ATTORNEYS

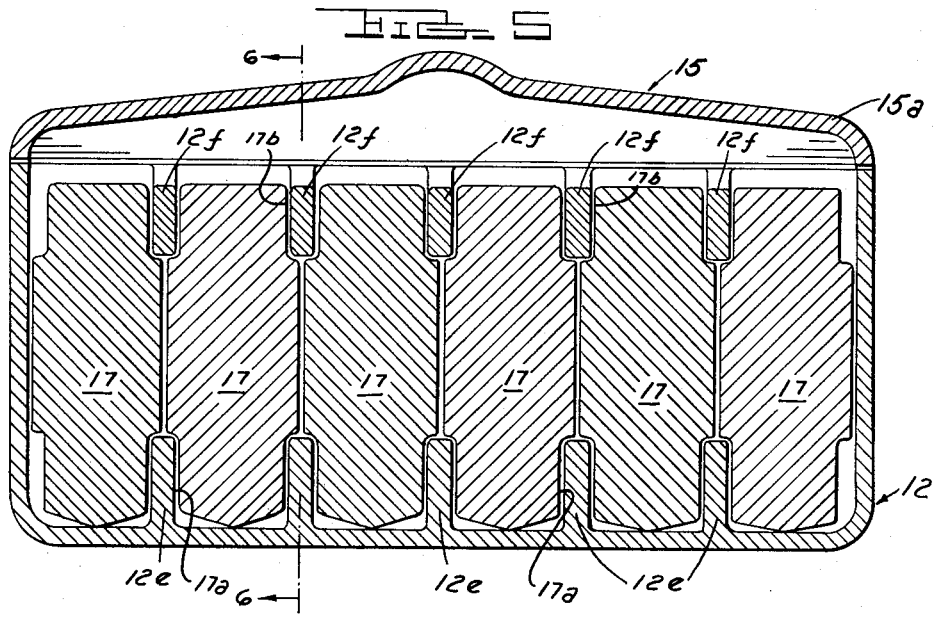
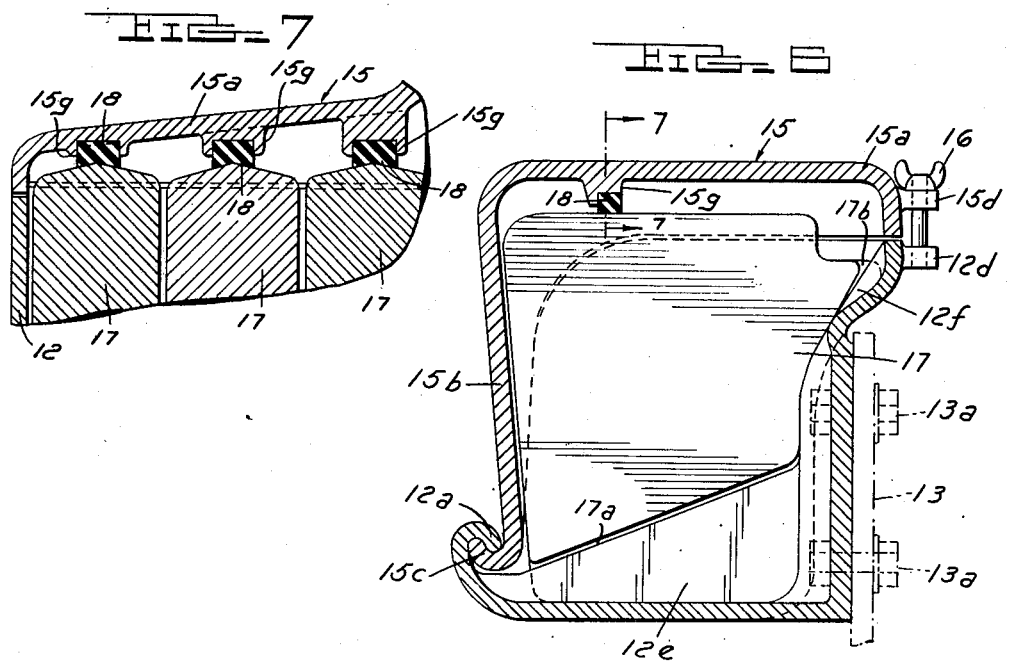

United States Patent Office 2,701,728
Patented Feb. 8, 1955

2,701,728

WEIGHT SELECTION DEVICE FOR STABILIZING TRACTORS

Raymond J. Miller, Detroit, Mich., assignor, by mesne assignments, to Ford Motor Company, Dearborn, Mich., a corporation of Delaware Application June 10, 1953, Serial No. 360,647

3 Claims. (Cl. 280—150)

This invention relates to a weight selection mechanism for tractors and particularly to a combination weight box and bumper for mounting on the front end of agricultural type tractors.

The agricultural tractor is called upon to perform a large variety of farm operations throughout the year. However, the power requirements involved in such operations involve a substantial variance. For example, in plowing, discing or similar soil fitting operations, the full power and tractive effort of the tractor is generally required to operate the implement, while in other field operations, such as planting, cultivating, mowing, raking or the like, only a fraction of the tractor's total power and tractive effort is required.

Heretofore, the practice of tractor manufacturers has been to design a tractor of relatively massive proportions so as to provide sufficient weight to insure that sufficient tractive weight will be available to absorb the full power output of the tractor in the soil fitting operations, such as plowing and discing. This means, of course, a substantial increase in the manufacturing cost of the tractor and a lower operating efficiency when the same heavy tractor is employed on the relatively light duty operations, for the total tractor mass has to be moved over the fields even though such mass might be much in excess of that required to provide the tractive effort for light duty operations.

Additionally, it is a well-known fact that the tractive effort of the tractor is further limited by the weight distribution of the tractor for when the tractor is utilized to pull a very heavy load by a trailing drawbar, the reaction forces inherently involved produce a transfer of weight from the front wheels of the tractor to the rear wheels, which weight transfer can eventually result in the front end of the tractor rising off the ground. Accordingly, when adding weight to a tractor to increase its tractive effort, it is quite desirable that a substantial proportion of the added weight be located near the front extremities of the tractor; however, the practice heretofore has been to add weight to the tractor in the form of rear wheel weights and liquid ballast in the rear tires.

Accordingly, it is an object of this invention to provide a weight selection mechanism for a tractor wherein the total mass of the tractor may be conveniently varied over a substantial range to provide maximum tractive effort for heavy duty operations and at the same time permit more efficient tractor operations on the lighter duty jobs.

Still another object of this invention is to provide an improved weight selection mechanism for a tractor which may be conveniently mounted at the front end of the tractor and which will also serve as a tractor bumper.

A particular object of this invention is to provide a simple, economically manufacturable and conveniently operated weight selection mechanism for tractors.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a weight selection device constructed in accordance with this invention shown in assembled relation to the front end of a well-known type of agricultural tractor;

Figure 2 is a perspective view of the weight box;

Figure 3 is a front perspective view of an individual weight element;

Figure 4 is a rear perspective view of the weight element of Figure 3;

Figure 5 is an enlarged scale, sectional view taken on the plane 5—5 of Figure 1;

Figure 6 is a sectional view taken on the plane 6—6 of Figure 5; and

Figure 7 is a partial sectional view taken on the plane 7—7 of Figure 6.

As shown on the drawings:

The weight selection device embodying this invention is indicated on the drawings generally by the numeral 11 and is constructed for mounting on the front extremities of a well-known type of tractor 10, preferably in a position immediately in front of the lower portions of the tractor radiator 10a so that the weight selection device 11 will perform the additional function of acting as a bumper for the tractor.

The weight selection device 11 primarily comprises a heavy box-like casting 12 which is open at its front and top sides. Suitable strap members 13 and 14 are bolted to the rear face of the weight box 12 by bolts 13a and extend around the tractor radiator 10a and are bolted at their other ends to suitable mounting flanges 10b and 10c on the tractor engine, so as to rigidly support the weight box 12 in a bumper-like position relative to the tractor radiator. The short front wall of weight box 12 is formed with an inturned curved lip portion 12a. A cover 15 is provided of generally L-shaped configuration, having a top wall portion 15a and a vertical side wall portion 15b which terminates in an outturned curved lip portion 15c, suitably shaped so as to cooperate with the inturned lip portion 12a of the weight box 12 to provide horizontal pivotal mounting for the cover 15 on the weight box 12. Suitable lugs 12d and 15d are respectively provided on the rear portions of the weight box 12 and cover 15 to receive bolt-like fastening elements 16 to secure the cover 15 in closed position on the box 12.

The interior of box 12 has a plurality of integrally formed upstanding partition walls 12e spaced along the bottom of the box and respectively extending up the rear side of box 12 to form continuation partition wall portions 12f in the top rear portion of the weight box 12. Hence, the partition walls 12e and 12f divide the interior cubical content of the weight box 12 into a plurality of substantially identical compartments; in the specific example illustrated there are six such compartments.

A plurality of identical weight members 17 are provided which are suitably shaped so as to fit snugly in any one of the compartments of the weight box 12. Thus, each weight member 17 has its bottom portions recessed, as indicated at 17a, so as to fit between and around any two adjacent partition walls 12e. The rear portion of each weight member 17 is additionally recessed, as indicated at 17b, so as to fit snugly between and around any two adjacent continuation partitions 12f. Hence, any selected number of weight members 17, up to the total number of compartments provided within the weight box 12 may be selectively inserted in the weight box 12 and, when the cover 15 is bolted in its closed position, such weight members are snugly retained within the weight box 12 and restrained by the partition walls 12e and 12f against any substantial movement.

In order to substantially eliminate any tendency of the weight members 17 to rattle within the weight box 12, the cover 15 is provided on its top inside surface with a plurality of depending bosses 15g. In each boss 15g a mass 18 of resilient material is suitably mounted by bonding, gluing or the like. Each resilient mass 18 projects downwardly from its associated boss 15g sufficient to come into firm engagement with the top of the particular weight member 17 that is mounted in the particular compartment. Preferably, the top surface of each weight member 17 is beveled to a somewhat angular configuration, as indicated at 17d, and the resilient mass 18 is positioned to straddle the beveled surface 17d and thus better resist any tendency of the weight members 17 to rattle in a transverse direction relative to the tractor.

In one embodiment of this invention, the weight of the box 12 and cover 15 constituted approximately 100 lbs. and each weight element 17 was designed so as to weigh approximately 50 lbs. Thus, the total weight of the tractor could be increased in seven increments by amounts up to 400 lbs. For plowing, discing or similar heavy duty operations, the entire extra weight would be added to the tractor and thus help provide adequate traction to insure utilization of the full power of the tractor engine. However, when the same tractor was to be used for light duty work, such as mowing or cultivating, the six weight elements could be quickly and conveniently removed from the weight box 12 to reduce the over-all weight of the tractor by 300 lbs. Hence the operating efficiency of the tractor is measurably increased.

If desired, an artistically shaped projection 15h may be integrally formed on the top central portions of cover 15 so as to simulate a headlight mounting and thus add to the over-all attractiveness and streamlined appearance of the weight box.

It will be noted that when the cover 15 is removed from the weight box, any one of the weight elements can be very conveniently removed through the open front wall of said box 12 by tipping the particular weight element forwardly about the curved lip 12a. In this connection, the recess 17e provides a convenient shoulder for gripping the particular weight element with the fingers and eliminates the possibility of pinching the fingers between the adjacent weight elements.

From the foregoing description, it will be apparent that this invention provides a simple, economically manufacturable weight selection device for agricultural type tractors which may permit any desired number of weight increments to be conveniently added to the tractor by the operator to suit the particular farming operation. Furthermore, the weight box embodying this invention additionally performs the function of a tractor bumper in protecting the lower portions of the tractor radiator from contact with any obstructions.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A weight selection mechanism for tractors comprising a hollow box-like casing, means for mounting said casing on a tractor, a plurality of equispaced vertical partition walls formed in said box to define a plurality of identical compartments, and a plurality of identical weight members, each insertable in any one of said compartments, each of said weight members being recessed to fit around the adjacent partition walls, whereby selected numbers of said weight members may be added to said box until the cubical content of said box is substantially completely occupied by said weight members.

2. A weight selection mechanism for tractors comprising a hollow box-like casing, means for mounting said casing on a tractor, a plurality of equispaced vertical partition walls formed in said box to define a plurality of identical compartments, a plurality of identical weight members, each insertable in any one of said compartments, each of said weight members being recessed to fit around the adjacent partition walls, whereby selected numbers of said weight members may be added to said box until the cubical content of said box is substantially completely occupied by said weight members, a cover detachably secured to said casing, and resilient means carried by said cover and engageable with each weight member inserted in said casing when said cover is secured to said casing in closed position, thereby preventing rattling of said weight members.

3. A weight selection mechanism for tractors comprising a hollow box-like casing open on one side, means for mounting said casing on a tractor, means dividing the interior of said casing into a plurality of identical compartments, a plurality of identical weight members, each of said weight members being snugly insertable in any one of said compartments through said open side, whereby varying amounts of weight may be selectively added to the tractor, a cover for said open side of said casing, means mounting said cover on said casing for pivotal movements between an open and a closed position, means for detachably securing said cover in said closed position, a plurality of projections formed on the inside surface of said cover and respectively overlying said compartments, each of said projections defining a recess, and a block of resilient material mounted in each recess and projecting outwardly therefrom to engage the adjacent weight member, thereby eliminating rattling of said weight members in said casing.

References Cited in the file of this patent

UNITED STATES PATENTS

| | | |
|---|---|---|
| 1,273,652 | Olerich | July 23, 1918 |
| 1,277,434 | Leadbeater | Sept. 3, 1918 |
| 1,329,655 | D'Humy | Feb. 3, 1920 |

FOREIGN PATENTS

| | | |
|---|---|---|
| 460,980 | France | Dec. 16, 1913 |